(12) United States Patent  
Ogasawara et al.

(10) Patent No.: US 9,342,407 B2  
(45) Date of Patent: May 17, 2016

(54) STORAGE CONTROL APPARATUS AND COMPUTER-READABLE RECORDING MEDIUM RECORDED WITH CONTROL PROGRAM

(71) Applicant: FUJITSU LIMITED, Kawasaki-shi, Kanagawa (JP)

(72) Inventors: Yasuhiro Ogasawara, Fujisawa (JP); Shigeru Akiyama, Kawasaki (JP); Tsukasa Matsuda, Kawasaki (JP); Hitoshi Kosokabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 260 days.

(21) Appl. No.: 13/942,761

(22) Filed: Jul. 16, 2013

(65) Prior Publication Data  
US 2014/0095928 A1 Apr. 3, 2014

(30) Foreign Application Priority Data  
Sep. 28, 2012 (JP) .................................. 2012-215904

(51) Int. Cl.  
*G06F 11/00* (2006.01)  
*G06F 11/14* (2006.01)  
*G06F 11/07* (2006.01)

(52) U.S. Cl.  
CPC ........ *G06F 11/1423* (2013.01); *G06F 11/0721* (2013.01); *G06F 11/0793* (2013.01); *G06F 11/142* (2013.01)

(58) Field of Classification Search  
CPC . G06F 11/14; G06F 11/1402; G06F 11/1415; G06F 11/142; G06F 11/1423  
See application file for complete search history.

(56) References Cited

U.S. PATENT DOCUMENTS

| | | | | |
|---|---|---|---|---|
| 6,104,211 | A * | 8/2000 | Alfke | 326/91 |
| 6,629,166 | B1 * | 9/2003 | Grun | G06F 13/128 |
| | | | | 703/25 |
| 7,596,744 | B1 * | 9/2009 | Kow et al. | 714/819 |
| 7,609,083 | B2 * | 10/2009 | Fuseya | 326/10 |
| 7,987,398 | B2 * | 7/2011 | Kitaoka et al. | 714/725 |
| 8,117,497 | B1 * | 2/2012 | Lesea | 714/30 |
| 2007/0050689 | A1 | 3/2007 | Sasakura | |
| 2010/0162223 | A1 | 6/2010 | Hattori et al. | |

FOREIGN PATENT DOCUMENTS

| | | |
|---|---|---|
| JP | 2007-58419 | 3/2007 |
| JP | 2010-152508 | 7/2010 |
| JP | 2012-14353 | 1/2012 |

\* cited by examiner

*Primary Examiner* — Joseph Kudirka  
(74) *Attorney, Agent, or Firm* — Fujitsu Patent Center

(57) ABSTRACT

A storage control apparatus includes a detection unit that detects a soft error of a memory for setting information included in a programmable logic circuit, when the soft error is detected, a communication control unit that changes a state of a communication path between the communication device and an upper device to a busy state, and a recovery processing unit that performs recovery processing of the memory for setting information of the programmable logic circuit, thereby efficiently resolving a soft error of the programmable logic circuit.

10 Claims, 8 Drawing Sheets

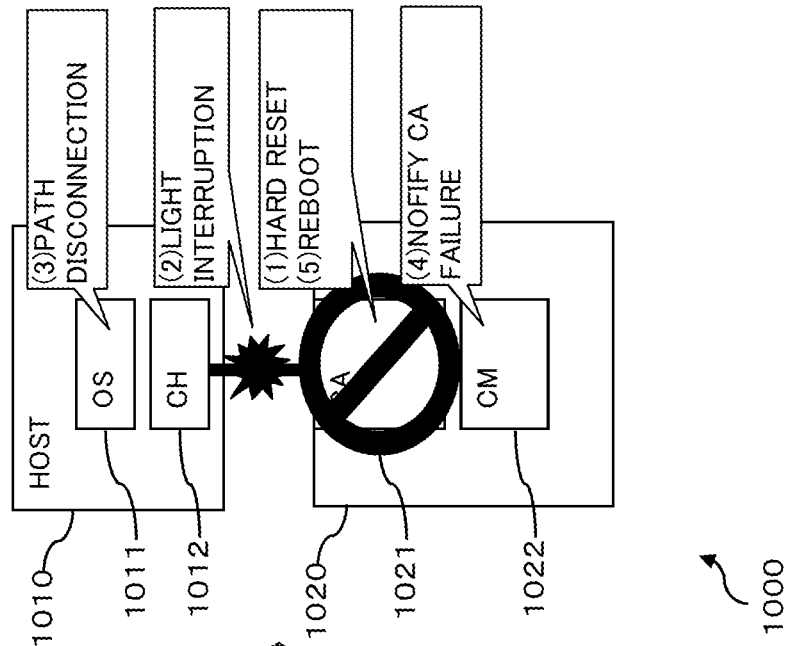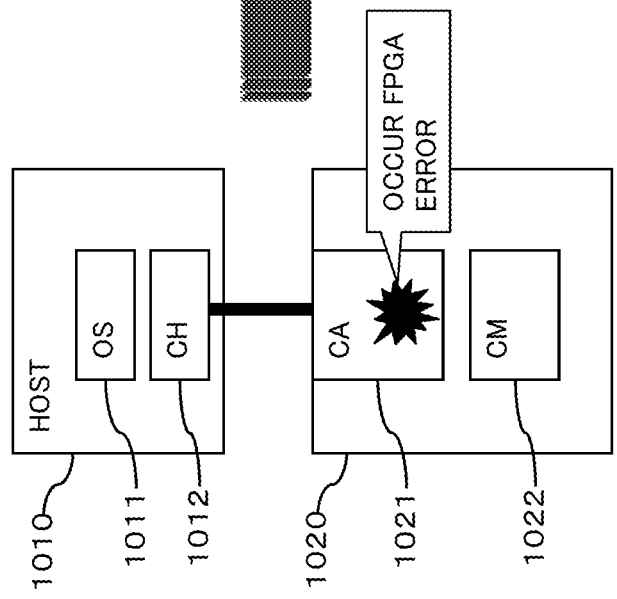

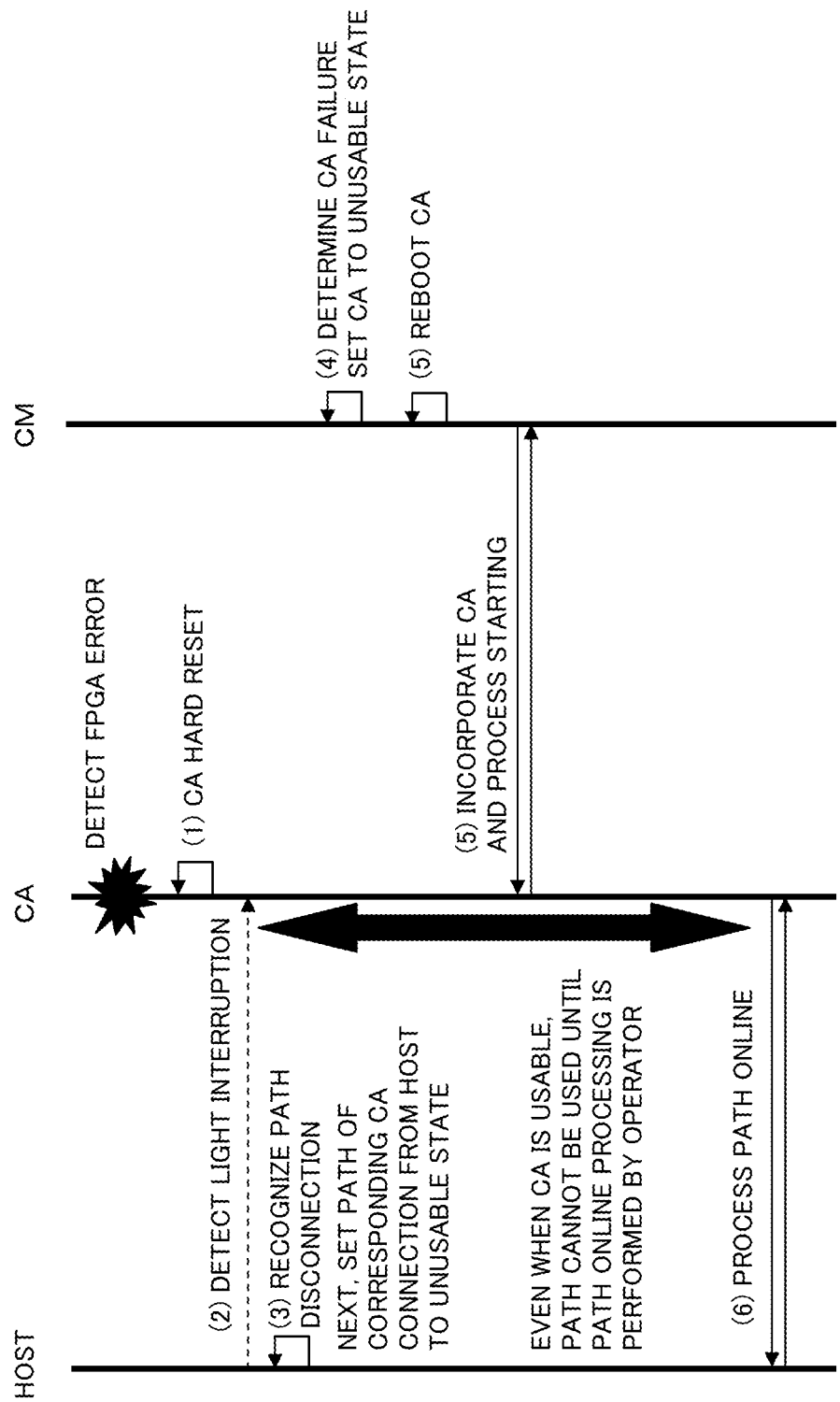

STORAGE CONTROL APPARATUS AND COMPUTER-READABLE RECORDING MEDIUM RECORDED WITH CONTROL PROGRAM

CROSS-REFERENCE TO RELATED APPLICATION

This application is based upon and claims the benefit of priority of the prior Japanese Patent Application No. 2012-215904, filed on Sep. 28, 2012, the entire contents of which are incorporated herein by reference.

FIELD

The embodiments discussed herein are related to a storage control apparatus, and a computer-readable recording medium recorded with a control program.

BACKGROUND

A field programmable gate array (FPGA; programmable logic circuit) has been known as a device that may electrically change a circuit design of a digital circuit. The FPGA is a large scale integration circuit (LSI) including a plurality of logic gates. The FPGA serves as a predetermined logic circuit by writing a configuration data describing a logic relationship and a connection relationship between the logic gates in a configuration random access memory (RAM) included in the FPGA.

A circuit design may be mounted within a shorter period of time than in the case of manufacturing circuit components depending on a design, by using the FPGA in circuit components of various electronic devices.

Further, the FPGA may change the configuration data to easily change the circuit design without changing hardware and therefore has been used in various products in addition to electronic devices. The FPGA has also been used for a channel adapter (CA) that is mounted in a storage control apparatus for instance.

Meanwhile, in the FPGA, errors may occur in the configuration RAM. As the errors occurring in the configuration RAM, there are a "hard error" that damages a circuit itself and a "soft error" that destructs data within a RAM due to radiation, such as cosmic rays.

When the "hard error" occurs in the configuration RAM, there is a need to exchange the FPGA itself, but when the "soft error" occurs, the FPGA may be reconfigured to be recovered.

For example, in the storage device using the FPGA in the CA, when the soft error occurs in the FPGA of the CA, the CA is hard reset to be rebooted, and thus the FPGA is recovered from the soft error state.

FIGS. 7A and 7B are diagrams illustrating processing at the time of the occurrence of the soft error of the FPGA in the storage control apparatus according to the related art and FIG. 8 is a sequence diagram of the processing.

As illustrated in FIG. 7A, in a storage system 1000 including a host 1010 and a storage device 1020, in a CA 1021 of the storage device 1020, processing according to the related art when a soft error is detected in the FPGA will be described. Note that, in FIGS. 7B and 8, reference numerals with parentheses represent corresponding processing.

The storage device 1020 includes the CA 1021, a controller module (CM) 1022 and the CA 1021 is connected with a channel (CH) 1012 of the host 1010. The CH 1012 is, for example, a fibre channel interface. In the example illustrated in FIGS. 7 and 8, the host 1010 is connected with the storage device 1020 by an optical fibre cable.

When the soft error of the FPGA is detected, first, (1) the hard reset is performed in the CA 1021 and a power supply of the CA 1021 is interrupted. By doing so, (2) the host 1010 is disconnected with the storage device 1020 and in the CH 1012 of the host 1010, a communication disconnection (light interruption) between the host 1010 and the storage device 1020 is detected.

In an operating system (OS) 1011 of the host 1010, (3) a path disconnection between the host 1010 and the storage device 1020 is recognized based on the detection of the light interruption of the CH 1012.

The CM 1022 (4) determines a failure of the CA 1021 since the CA 1021 is hard reset, sets the CA 1021 to an unusable state, and outputs a failure notification. By receiving the failure notification, a repair and maintenance customer engineer (CE) of an apparatus is dispatched to, for example, perform a board exchange operation of the CA 1021.

The CM 1022 (5) reboots (restarts) the CA 1021 and incorporates the CA 1021. Subsequently, (6) an operator operates the host 1010 to perform path online processing, such that the path between the host 1010 and the storage device 1020 is recovered and the storage system 1000 is in a usable state.

According to the conventional method of recovering from soft error of FPGA, the path between the host 1010 and the CA 1021 is disabled during the time period from the recognition (3) of the path disconnection between the host 1010 and the storage device 1020 to the path online processing (6).

[Patent Literature 1] Japanese Laid-open Patent Publication No. 2012-14353

However, in the storage system according to the related art, in order to recover the path between the host 1010 and the storage device 1020, an operator needs to perform the pass online processing operation after completion of CA reboot (see reference numeral (5)). Therefore, there is a problem in that the recovery of the storage system 1000 may not be performed rapidly and is complicated.

Further, as described above, when the failure of the CA 1021 is determined, and thus the failure notification (see reference numeral (4)) is performed by the CM 1022, there is a case in which the repair and maintenance customer engineer of the apparatus is dispatched when the failure notification is issued and the board exchange operation of the CA 1021 is performed. However, since the soft error of the FPGA does not incur the abnormality of hardware of the FPGA, the board exchange operation is unnecessary and inefficient.

SUMMARY

For this reason, the storage control apparatus is a storage control apparatus that is connected with an upper device by a communication device, controls a data access to a storage device and includes a detection unit that detects a soft error of a memory for setting information included in a programmable logic circuit, a communication control unit that changes a state of a communication path between the communication device and the upper device to a busy state, and a recovery processing unit that performs recovery processing of the memory for setting information of the programmable logic circuit, in which when the detection unit detects the soft error, the communication control unit changes the state of the communication path between the communication device and the upper device to the busy state.

Further, the storage control apparatus is a storage control apparatus that is connected with an upper device by a communication device, controls a data access to a storage device and includes a detection unit that detects a soft error of a memory for setting information included in a programmable logic circuit, a processing unit that causes a management device managing the communication device to exclude the communication device from a monitored object, and a recovery processing unit that performs recovery processing of the memory for setting information of the programmable logic circuit, in which when the detection unit detects the soft error, the processing unit changes the state of the communication path between the communication device and the upper device to the busy state.

In addition, a computer-readable recording medium recorded with a control program causes a computer to execute the following processing: detecting a soft error of a memory for setting information included in a programmable logic circuit; when the soft error is detected, changing a state of a communication path between a communication device and an upper device to a busy state; and recovering the memory for setting information of the programmable logic circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 7A and 7B are diagrams for describing the processing at the time of occurrence of the soft error of the FPGA in the storage device according to the related art; and FIG. 8 is a sequence diagram for describing processing at the time of the occurrence of the soft error of the FPGA in the storage device according to the related art.

DESCRIPTION OF EMBODIMENTS

Figure 1:
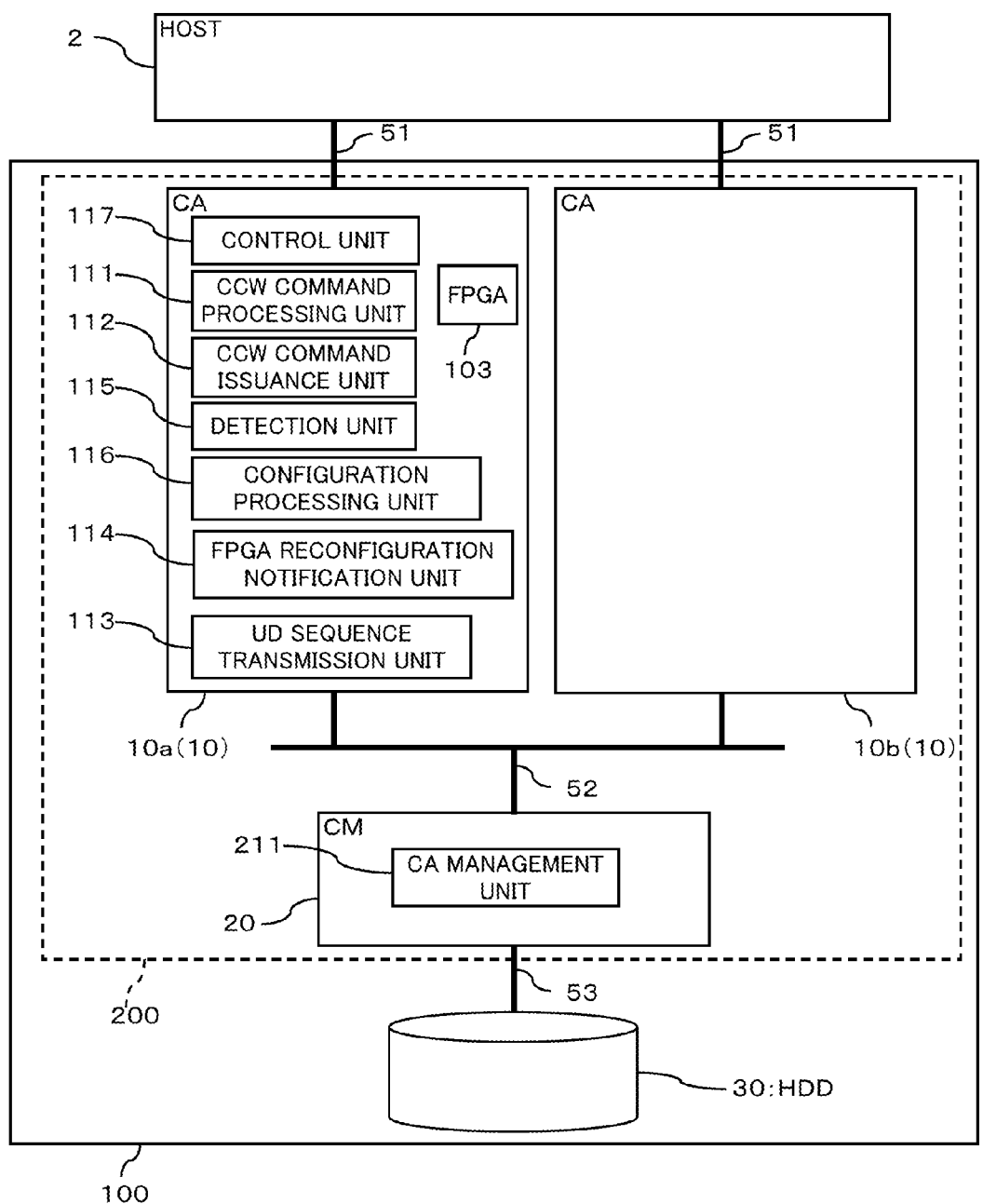
FIG. 1 is a diagram schematically illustrating a functional configuration of a storage system as an example of an embodiment.

Hereinafter, embodiments relating to a storage control apparatus and a control program will be described with reference to the accompanying drawings. However, the embodiments described herein are only an example, and therefore application of various modification examples or technologies that are not specified in the embodiments is not construed as being excluded. That is, the embodiment may be variously modified without departing from the gist. Further, each drawing is not construed as including only components illustrated in the drawings but may include other functions, and the like.

Figure 2:
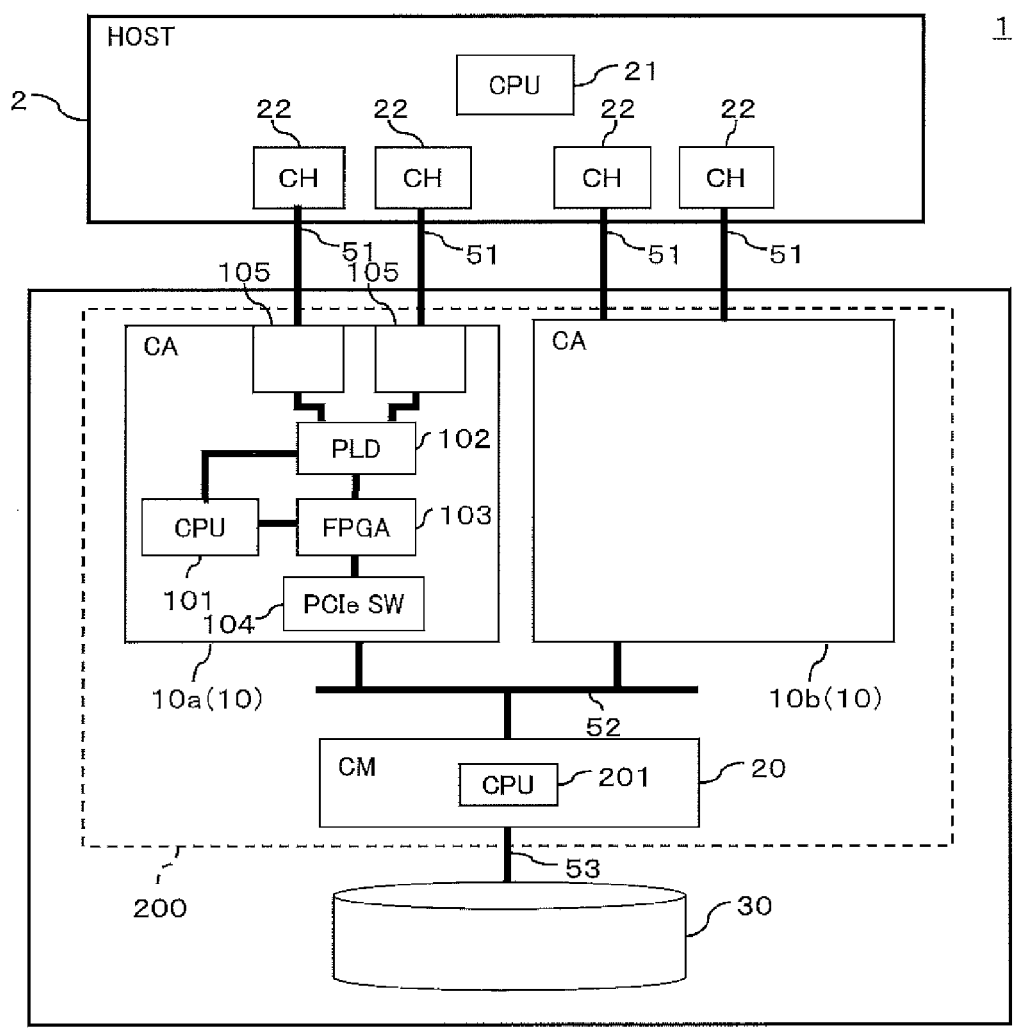
FIG. 2 is a diagram schematically illustrating a hardware configuration of the storage system as the example of the embodiment.

FIG. 1 is a diagram schematically illustrating a functional configuration of a storage system 1 as an example of an embodiment and FIG. 2 is a diagram schematically illustrating a hardware configuration of the storage system 1.

As illustrated in FIG. 2, the storage system 1 includes a storage device 100 and is communicably connected with at least one (one illustrated in FIG. 1) host 2.

The host 2 is, for example, a computer (information processing device, upper device) including a server function, transmits and receives various data, such as a command and a response, between the host 2 and the storage device 100.

As illustrated in FIG. 2, the host 2 includes a central processing unit (CPU) 21 and a channel (CH) 22. The CPU 21 is a processing device that performs various controls or operations and realizes various functions by executing OS or programs that are stored in a memory (not illustrated), and the like.

The host 2 transmits a disk access command, such as read/write, to the storage device 100 to write or read data in a storage region provided by the storage device 100.

The channel 22 is a network interface that is communicably connected with the storage device 100. In the example illustrated in FIG. 2, the channel 22 is connected with a light module 105 included in the storage device 100 through a communication line 51 (host path).

The storage device 100 provides the host 2 with a storage region and is communicably connected with the host 2 through the communication line 51.

As illustrated in FIG. 2, the storage device 100 includes a storage control apparatus 200 and a hard disk drive (HDD; storage device) 30.

The storage device 100 is connected with the host 2 and is connected with a drive enclosure (not illustrated).

The HDD 30 is a storage device that stores data in a readable and writable state and serves as a storage unit that may store data received from the host 2. Note that, for convenience, FIGS. 1 and 2 illustrate that the storage device 100 includes only one HDD 30 but the invention is not limited thereto, and therefore the storage device 100 may include at least two HDDs 30. In addition, the storage device 100 may also be redundant arrays of inexpensive disks (RAID) that combine the plurality of HDDs 30 to be managed as one redundant storage.

The storage control apparatus 200 receives the disk access command or the data from the host 2 and performs a disk access (read/write) to the HDD 30 based on the disk access command. As illustrated in FIG. 2, the storage control apparatus 200 includes channel adapters (hereinafter, referred to as CA) 10a and 10b and a controller module (hereinafter, referred to as CM) 20. The CAs 10a and 10b and the CM 20 are communicably connected with each other through a communication line 52.

The CM 20 is a controller (control device and management device) that controls an operation within the storage device 100 and receives commands, such as read/write, from the host 2 to perform various controls. The CM 20 is connected with the host 2 through the CAs 10a and 10b. Further, the CM 20 is connected with the HDD 30 through a communication line 53. Further, the CM 20 receives the commands, such as read/write, that are transmitted from the host 2 and controls the HDD 30.

As illustrated in FIG. 2, the CM 20 includes a CPU 201 or a memory (not illustrated), and the like. Further, the CPU 21 realizes a function as a CA management unit 211 as illustrated in FIG. 1, by executing a control program stored in the memory, and the like.

The CA management unit 211 manages the CAs 10a and 10b and monitors whether the CAs 10a and 10b are normally operated. When the CA management unit 211 detects any abnormality in the CAs 10a and 10b, the CA management unit 211 sets the CAs 10a and 10b to an unusable state and outputs a failure notification to the outside. Further, the CA management unit 211 also includes a function of restarting the CAs 10a and 10b. Note that, the functions such as the monitoring, the setting of the unusable state, the output of the failure notification, the restarting of the CAs 10a and 10b by the CA management unit 211 may be realized by an already known method and the detailed description thereof will be omitted.

Further, when a status signal of an FPGA reconfiguration start (FPGA reconfiguration start notification) is notified from a reconfiguration notification unit 114 to be described below, the CA management unit 211 excludes the CA 10 of the notification source from a monitored object to set the state of the CA 10 to an unusable state. Therefore, the access to the CA 10 from the CM 20 may not be realized. Further, in this case, the CA management unit 211 does not perform the failure notification to the outside.

Further, when a status signal of a reconfiguration stop of the FPGA (FPGA reconfiguration completion notification) is notified from the reconfiguration notification unit 114 to be described below, the CA management unit 211 includes the CA 10 of the notification source as a monitored object to set the state of the CA 10 to a usable state.

Therefore, the access to the CA 10 from the CM 20 may be realized. Further, even in this case, the CA management unit 211 does not perform the failure notification to the outside.

Further, the CM 20 includes a function as a general CM in the storage control apparatus 200. For example, the CM 20 includes a resource management function that manages a resource such as the HDD 30 of the storage device 100, a copy control function that controls a copy of data between a plurality of storage devices, and the like. Note that, the copy control function or the resource management function is already known technologies, and therefore the detailed description thereof will be omitted.

The CAs 10a and 10b are interface controllers (communication adapter; communication device) that are communicably connected with the host 2, and the like. The CAs 10a and 10b receive data transmitted from the host 2, and the like or transmit data output from the CM 20 to the host 2, and the like. That is, the CAs 10a and 10b control a data input/output (I/O) between external devices such as the host 2. The CAs 10a and 10b include the same configuration. Note that, for convenience, FIGS. 1 and 2 illustrate a functional configuration or a hardware configuration of only the CA 10a. Hereinafter, as reference numerals indicating the CA, when there is a need to specify one of the plurality of CAs, reference numerals 10a and 10b are used, but when any CA is indicated, reference numeral 10 is used.

As illustrated in FIG. 2, the CA 10 includes a CPU 101, a programmable logic device (PLD) 102, an FPGA 103, a peripheral components interconnect express switch (PCIe SW) 104, and light modules 105 and 105. In addition to the components, the CA 10 also includes a memory (not illustrated), and the like.

The light modules 105 and 105 are interface modules that perform light communication between the CA and the host 2 and at least one (two in the example illustrated in FIG. 2) light module is each included in the CAs 10a and 10b. The light modules 105 and 105 are each connected with the channel 22 of the host 2 through the communication line 51.

The FPGA 103 is a programmable logic circuit and is an LSI that has a plurality of logic gates. The FPGA 103 realizes a function as a logic circuit depending on the configuration data that is stored in a configuration random access memory (RAM) (memory for setting information) (not illustrated) included in the FPGA 103.

Further, the FPGA 103 also includes a function of a protocol control and data operation for interface with the host 2 through the light module 105.

The PLD 102 is a programmable logic device. The PLD 102 includes a function of realizing the configuration of the FPGA 103 and sets the data of the configuration RAM and the configuration data (circuit data) that are stored in a read only memory (ROM) (not illustrated), and the like.

Further, the PLD 102 includes a reconfiguration function of rewriting the configuration data already written in the configuration RAM by using the configuration data stored in the ROM, and the like. Therefore, the FPGA 103 in which a soft error occurs may be recovered. That is, the PLD 102 realizes a function as a configuration processing unit (recovery processing unit) 116 illustrated in FIG. 1. By the PLD 102, the configuration and the reconfiguration of the FPGA 103 are performed depending on an instruction from a control unit 117 (configuration processing control unit) of the CPU 101 to be described below.

In addition, the PLD 102 includes a function of setting an unconditional-disconnect (UD) sequence to a transmission state and releasing a transmission state of the UD sequence, for the host 2. The PLD 102 starts (setting of the transmission state) the transmission of the UD sequence signal (communication control signal) to the host 2 according to the instruction of the CPU 101 to be described below. In detail, the PLD 102 fixes the UD sequence transmission signal as the transmission state.

The CA 10 transmits the UD sequence signal to the host 2 (host I/F) to move to a connection recovery state. In the connection recovery state, an I/O command may not be output to the CA 10 (storage device 100) from the host 2, such that the CA 10 is in a so-called busy state.

Further, the PLD 102 stops (the releasing of the transmission state) transmission of the UD sequence signal depending on the instruction from the control unit 117 (UD sequence transmission control unit) of the CPU 101 to be described below. In detail, the PLD 102 stops the output of the UD sequence transmission signal, that is in the transmission state, to release (release fixing) the transmission state.

The host 2 receiving the UD sequence signal transmits an unconditional-disconnect-response (UDR) sequence signal as a response of the UD sequence signal to the CA 10 of the transmission source of the UD sequence signal. The host 2 outputs the UDR sequence signal until the transmission state of the UD sequence signal is released. Therefore, the host path between the host 2 and the CA 10 is in a busy state.

In the storage system 1, the host path may be changed to the busy state without including a dedicated protocol chip, and the like. When the host path is in the busy state, the host 2 does not recognize the disconnection of the host path.

Further, the busy state of the host path may be easily set/released in a short period of time by fixing/releasing the transmission state of the UD sequence signal.

By the PLD 102, the transmitting or releasing of the UD sequence signal is performed depending on the instruction from the control unit 117 (UD sequence transmission control unit) of the CPU 101 to be described below.

Note that, the setting or releasing of the UD sequence transmission state may be realized by the already known method and the detailed description thereof will be omitted. The UD sequence is defined in, for example, single-byte command code sets connection architecture (SBCON) or enterprise system connection (registered mark: ESCON). In addition, the PLD 102 also includes an interface control function.

As such, the PLD 102 realizes a function as UD sequence transmission units (first communication control unit, second communication control unit) 113, as illustrated in FIG. 1.

Further, the PLD 102 includes a function of detecting the soft error of the FPGA 103. The PLD 102 uses, for example, a cyclic redundancy check (CRC) error detection function to detect the soft error of the FPGA 103. Note that, the soft error detection function of the FPGA 103 by the PLD 102 is realized by various already known methods and the detailed description thereof will be omitted. That is, the PLD 102 realizes a function as a detection unit 115 illustrated in FIG. 1. When the PLD 102 detects the soft error of the FPGA 103, the PLD 102 notifies the CPU 101 of the detected soft error by outputting an interrupt (PLD interrupt) signal.

Further, the PLD 102 outputs the FPGA reconfiguration start notification (first notification signal) or the FPGA reconfiguration completion notification (second notification signal) to the CM 20.

The FPGA reconfiguration start notification is a signal notifying that the reconfiguration of the FPGA 103 starts. As the FPGA reconfiguration start notification, an "adapter ready assert" signal, and the like, used to notify the CM 20 that the initialization of, for example, a CA port (not illustrated) is completed may be diverted.

As described above, the CM 20 receiving the FPGA reconfiguration start notification excludes the CA 10 of the notification source from the monitored object to set the CA 10 to the unusable state. Therefore, the access to the CA 10 from the CM 20 may not be realized. Further, in this case, the CA management unit 211 does not perform the failure notification to the outside.

In addition, when the CM 20 receives the FPGA reconfiguration completion notification, the CM 20 includes the CA 10 of the notification source as the monitored object and sets the CA 10 to the usable state. Therefore, the access to the CA 10 from the CM 20 may be realized.

The FPGA reconfiguration completion notification is a signal notifying that the reconfiguration of the FPGA 103 is completed. As the FPGA reconfiguration completion notification, an "adapter ready deassert" signal, and the like, used to notify the CM 20 that the CA 10 may not be used due to, for example, the reset of the CA port, and the like, may be diverted. That is, the PLD 102 realizes a function as the FPGA reconfiguration notification units (first processing unit, second processing unit, processing unit) 114, as illustrated in FIG. 1.

By the PLD 102, the output of the FPGA reconfiguration start notification and the FPGA reconfiguration completion notification is performed depending on the instruction from the control unit 117 (FPGA reconfiguration notification control unit) of the CPU 101 to be described below.

The PCIe switch 104 is an interface module that performs communication through a PCIe bus.

The memory is a storage device that includes a ROM and a RAM. The ROM of the memory is written with a software program (control program) or data for the program that is associated with the control of the CA 10. The software program on the memory is appropriately loaded in the CPU 101 and is executed. Further, the RAM of the memory is used as a primary storage memory or a working memory.

The CPU 101 is a processing device that performs various controls or operations and realizes various functions by executing the control program stored in the memory. That is, the CPU 101 serves as a channel command word (CCW) command processing unit 111, a CCW command issuance unit 112, and the control unit 117 that are illustrated in FIG. 1.

The CCW command processing unit 111 performs the processing on the CCW issued from the host 2, and the like, depending on the CCW. For example, the CCW command processing unit 111 performs the IO processing on the HDD 30 based on the CCW received from the host 2. The CCW command issuance unit 112 issues the CCW to, for example, the HDD 30.

Note that, the functions as the CCW command processing unit 111 and the CCW command issuance unit 112 are realized by various already known methods and the detailed description thereof will be omitted.

The control unit 117 performs a control for realizing each function of the PLD 102 and the FPGA 103.

For example, the control unit (detection unit) 117 receives the interrupt signal indicating that the soft error of the FPGA 103 is detected from the PLD 102 (detection unit 115) to detect the soft error of the FPGA 103. When the control unit 117 detects the soft error of the FPGA 103, the control unit 117 instructs the PLD 102 (UD sequence transmission unit 113) to start the transmission of the UD sequence signal. Further, the control unit 117 instructs the PLD 102 to start the transmission of the UD sequence signal and then instructs the PLD 102 (UD sequence transmission unit 113) to stop the transmission of the UD sequence signal when it is confirmed that the reconfiguration of the FPGA 103 is completed and the communication is normally performed between the CA 10 and the CM 20. That is, the control unit 117 serves as an UD sequence transmission control unit that controls the PLD 102 (UD sequence transmission unit 113) to transmit or stop the transmission of the UD sequence signal.

Further, the control unit 117 instructs the PLD 102 (FPGA reconfiguration notification unit 114) to transmit the FPGA reconfiguration start notification or the FPGA reconfiguration completion notification to the CM 20. That is, the control unit 117 serves as an FPGA reconfiguration notification control unit that controls the PLD 102 (FPGA reconfiguration notification unit 114) to transmit the FPGA reconfiguration start notification and the FPGA reconfiguration completion notification.

In addition, the control unit 117 instructs the PLD 102 (configuration processing unit 116) to perform the reconfiguration of the FPGA 103. That is, the control unit 117 serves as the reconfiguration processing control unit that controls the PLD 102 (configuration processing unit 116) to perform the reconfiguration of the FPGA 103.

Further, the control unit 117 also includes a function that instructs the FPGA 103 to stop or start the transmission of a direct memory access (DMA). The I/F processing between the CA 10 and the CM 20 is not performed by stopping the transmission of the DMA to the FPGA 103.

That is, when the detection unit 115 detects the soft error, the control unit 117 also serves as a transmission suppression unit that stops the data transmission processing to the CM 20.

Note that, as described above, a program for realizing a function as the CA management unit 211, and the like in the CM 20 or a function as the CCW command processing unit 111, the CCW command issuance unit 112, and the control unit 117 in the CA 10 is provided in a form that is recorded in computer-readable recording media, such as, for example, a flexible disk, CDs (CD-ROM, CD-R, CD-RW, and the like), DVDs (DVD-ROM, DVD-RAM, DVD-R, DVD+R, DVD-RW, DVD+RW, HD, DVD, and the like), a Blue-ray disk, a magnetic disk, an optical disk, a magneto-optical disk. In addition, the computer reads a program from the recording media, transmits the read program to an internal storage device or an external storage device, stores and uses the transmitted program therein. In addition, the program may be written in the storage devices (recording media), such as, for example, a magnetic disk, an optical disk, and a magneto-optical disk, and provided to a computer through a communication path from the storage devices.

When realizing the function as the CA management unit 211 or the CCW command processing unit 111, the CCW command issuance unit 112, the control unit 117, and the like, the program stored in the internal storage device (in the embodiment, memory (not illustrated)) is executed by a microprocessor of a computer (in the embodiment, CPUs 21 and 101). In this case, the program recorded in the recording medium may be read and executed by the computer.

Note that, in the embodiment, a computer is a concept including hardware and an operating system and means hardware operated under the control of the operating system. In addition, when the hardware is operated in an application program alone without the operating system, the hardware itself corresponds to a computer. The hardware includes at least a microprocessor such as CPU, a unit for reading a computer program recorded in the recording medium and in the embodiment, the CA 10 or the CM 20 has a function as a computer.

Figure 3:
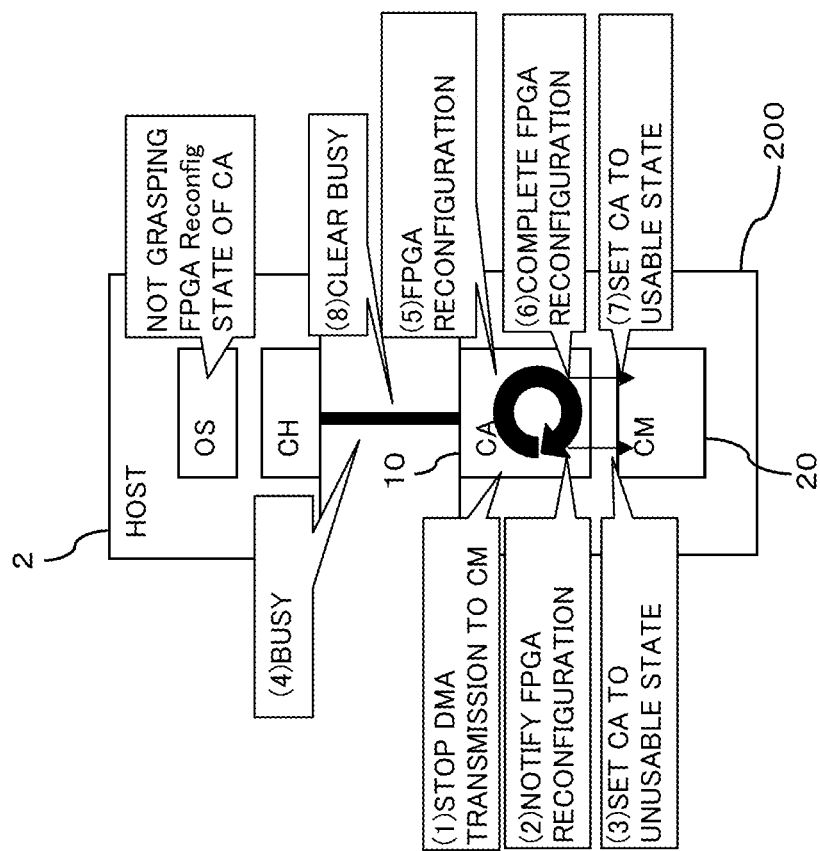
FIG. 3 is a diagram for describing a processing outline at the time of occurrence of a soft error of an FPGA in the storage system as the example of the embodiment.
Figure 4:
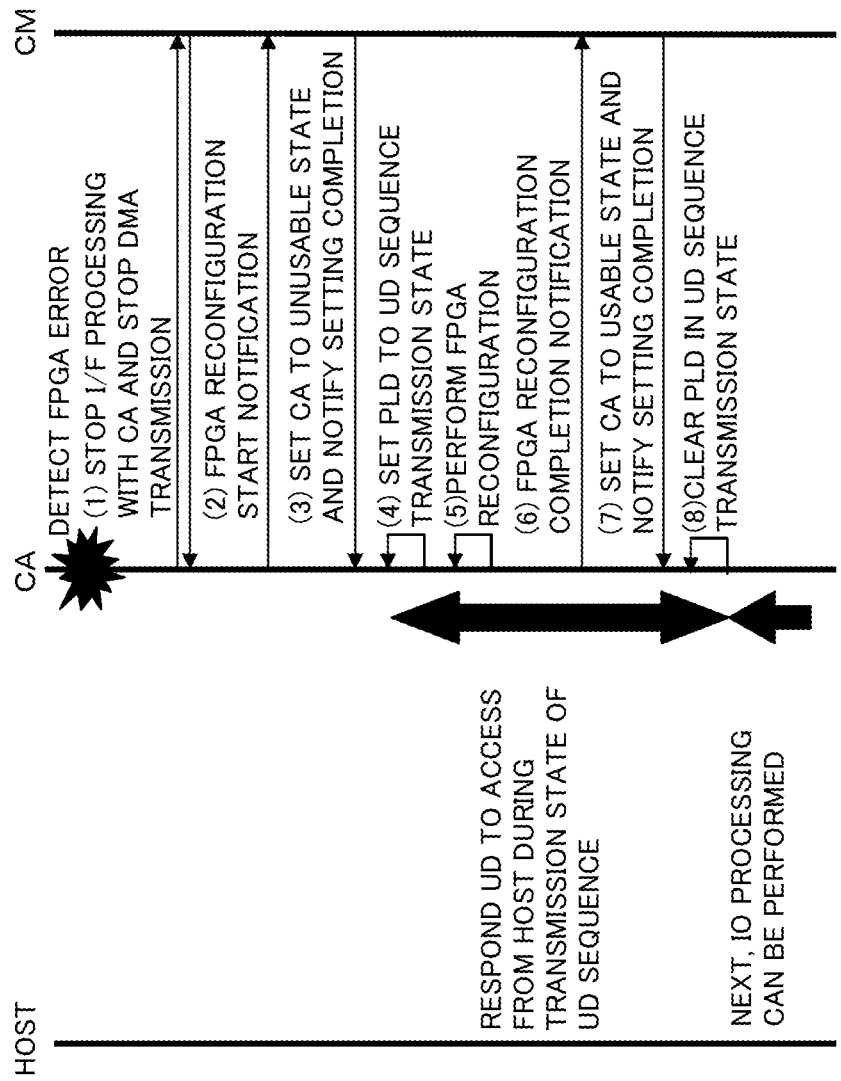
FIG. 4 is a sequence diagram for describing the processing outline at the time of the occurrence of the soft error of the FPGA in the storage system as the example of the embodiment.

In the storage system 1 as the example of the embodiment configured as described above, a processing outline at the time of the occurrence of the soft error of the FPGA will be described with reference to FIGS. 3 and 4. Note that, FIG. 3 is a diagram illustrating the processing outline at the time of the occurrence of the soft error of the FPGA in the storage system 1 and FIG. 4 is a sequence diagram thereof. Note that, in FIGS. 3 and 4, reference numerals with parentheses represent corresponding processing.

When the soft error occurs in the FPGA 103 of the CA 10, the detection unit 115 detects the soft error.

(1) In the CA 10, the CPU 101 (control unit 117) ends all the I/F processing with the CM 20 and instructs the FPGA 103 to stop the DMA transmission. The FPGA 103 stops the DMA transmission based on the DMA transmission stop instruction. Therefore, new I/F processing is not performed between the CA 10 and the CM 20.

(2) Subsequently, the PLD 102 (FPGA reconfiguration notification unit 114) transmits the FPGA reconfiguration start notification to the CM 20.

(3) The CM 20 receiving the FPGA reconfiguration start notification sets the CA 10 to the unusable state and excludes the CA 10 from the monitored object. Therefore, the communication to the CA 10 from the CM 20 is not performed. The CM 20 waits for the FPGA reconfiguration completion notification without performing the failure notification (CA failure notification) to the CA 10.

(4) In the CA 10, the PLD 102 (UD sequence transmission unit 113) sets the UD sequence signal to the transmission state to be in the connection recovery state, thereby changing the host path to the busy state. The host 2 receiving the UD sequence signal does not recognize the path disconnection.

(5) In the CA 10, the PLD 102 (configuration processing unit 116) performs the reconfiguration of the FPGA 103 and performs the initialization of the register, the refresh of the memory, or the like.

(6) Subsequently, the PLD 102 (FPGA reconfiguration notification unit 114) transmits the FPGA reconfiguration completion notification to the CM 20 to notify that the reconfiguration of the FPGA 103 is completed.

(7) The CM 20 receiving the FPGA reconfiguration completion notification returns the CA 10 to the usable state. Therefore, the communication to the CA 10 of the transmission source of the FPGA reconfiguration completion notification from the CM 20 is feasible.

(8) Further, the PLD 102 (UD sequence transmission unit 113) releases the UD sequence transmission state to release the busy state of the host path. By releasing the busy state of the host path, the data processing is feasible between the host 2 and the storage device 100 through the communication line 51.

Figure 5:
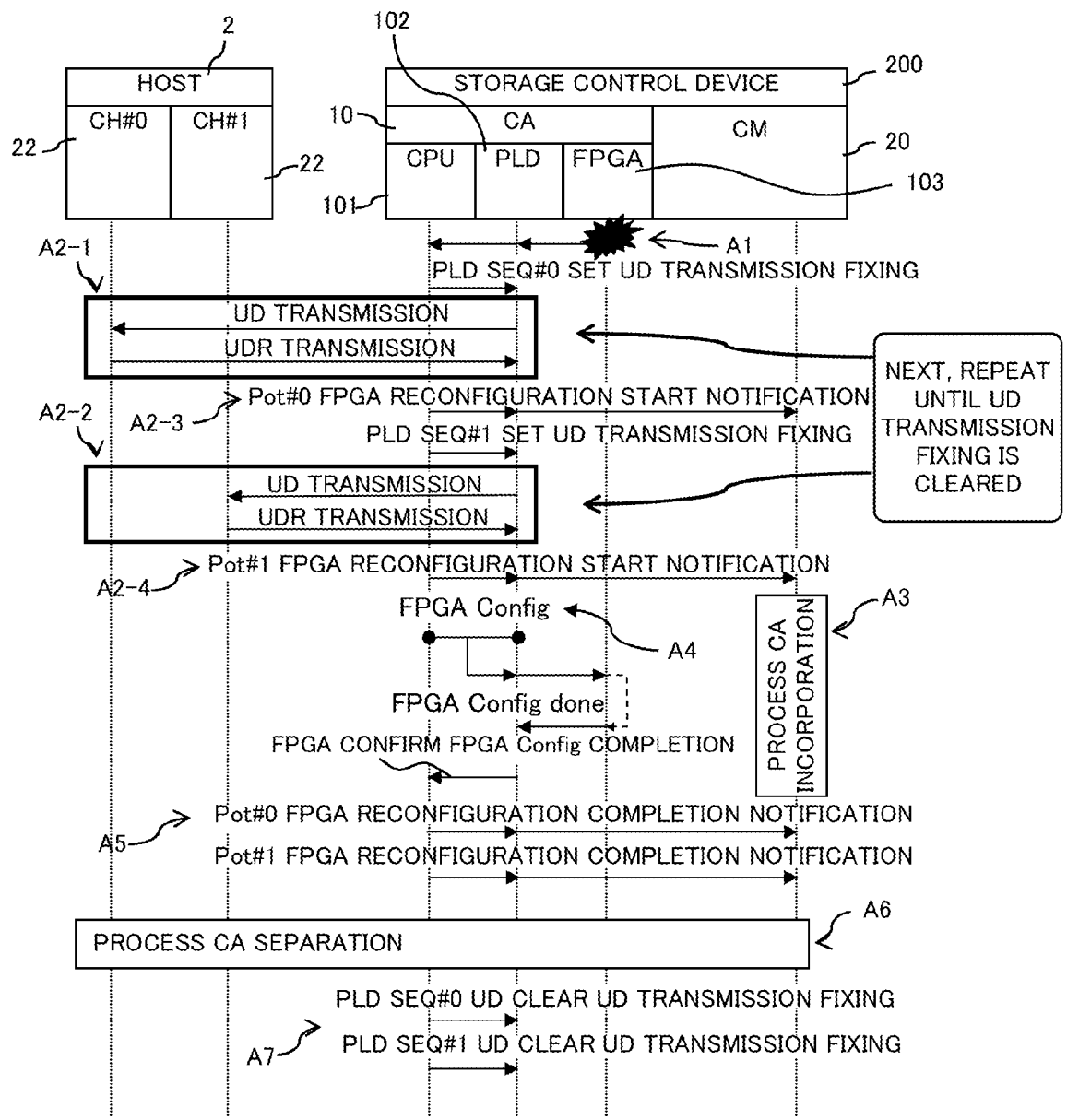
FIG. 5 is a sequence diagram for describing the detailed processing at the time of the occurrence of the soft error of the FPGA in the storage system as the example of the embodiment.

FIG. 5 is a sequence diagram for describing the detailed processing at the time of the occurrence of the soft error of the FPGA 103 in the storage system 1 as the example of the embodiment.

When the soft error of the FPGA 103 occurs (see sign A1) in the CA 10 of the storage device 100, the PLD 102 (detection unit 115) generates the PLD interrupt to the CPU 101. Therefore, the CPU 101 recognizes (detects) the soft error of the FPGA 103.

In the CA 10, the CPU 101 (control unit 117) instructs the FPGA 103 to stop the DMA transmission. In addition, the CPU 101 (control unit 117) sets the UD sequence signal to the transmission state to request the transmission fixing setting of the UD sequence signal to the PLD 102 (UD sequence transmission unit 113).

Therefore, the PLD 102 (UD sequence transmission unit 113) transmits the UD sequence signal to the host 2 and is in the connection recovery state. The host 2 transmits the UDR sequence signal as a response of the UD sequence signal to the CA 10.

In the example illustrated in FIG. 5, the PLD 102 transmits the UD sequence signal as SEQ #0 to CH #0 of the host 2 and transmits the UDR sequence signal from CH #0 of the host 2 (see sign A2-1). In addition, the PLD 102 transmits the UD sequence signal as SEQ #1 to CH #1 of the host 2 and transmits the UDR sequence signal from CH #1 of the host 2 (see sign A2-2).

The transmission and reception of the UD sequence signal and the UDR sequence signal are repeatedly performed until the UD sequence signal transmission fixing is released.

Further, in the CA 10, the CPU 101 (FPGA reconfiguration notification unit 114) notifies the CM 20 of the FPGA reconfiguration start.

In the example illustrated in FIG. 5, the CPU 101 starts the transmission and reception of the UD sequence signal/UDR sequence signal as the SEQ #0 to and from CH#0 of the host 2 and then transmits the FPGA reconfiguration start notification of the FPGA 103 of port #0 (see sign A2-3). Further, the CPU 101 starts the transmission and reception of the UD sequence signal/UDR sequence signal as SEQ #1 to and from CH#1 of the host 2 and then transmits the FPGA reconfiguration start notification of the FPGA 103 of port #1 (see sign A2-4).

In the CM 20, the separation processing of the CA 10 is performed when the FPGA reconfiguration start notification is reached (see sign A3). That is, the CA 10 is excluded from the monitored object.

In the CA 10, the CPU 101 causes the PLD 102 (configuration processing unit 116) to perform the reconfiguration of the FPGA 103. When the reconfiguration of the FPGA 103 is completed, the configuration processing unit 116 notifies the CPU 101 of the configuration completion confirmation of the FPGA 103 (see sign A4).

Subsequently, in the CA 10, the CPU 101 (FPGA reconfiguration notification unit 114) notifies the CM 20 of the FPGA reconfiguration completion notification.

In the example illustrated in FIG. 5, the CPU 101 transmits the FPGA reconfiguration completion notification of the FPGA 103 of ports #0 and #1, respectively, to the CM 20 (see sign A5).

In the CM 20, the incorporation processing of the CA 10 is performed when the FPGA reconfiguration completion notification is reached (see sign A6). That is, the CA 10 is set as the monitored object.

In the CA 10, the CPU 101 requests the transmission fixing releasing of the UD sequence signal to the PLD 102 (UD sequence transmission unit 113) (see sign A7). In the example illustrated in FIG. 5, the PLD 102 requests the transmission fixing releasing of the UD sequence signal to SEQ #0 and #1, respectively.

Subsequently, in the CA 10, the PLD 102 transmits a generally processed frame to the host 2, instead of the UD sequence signal.

Figure 6:
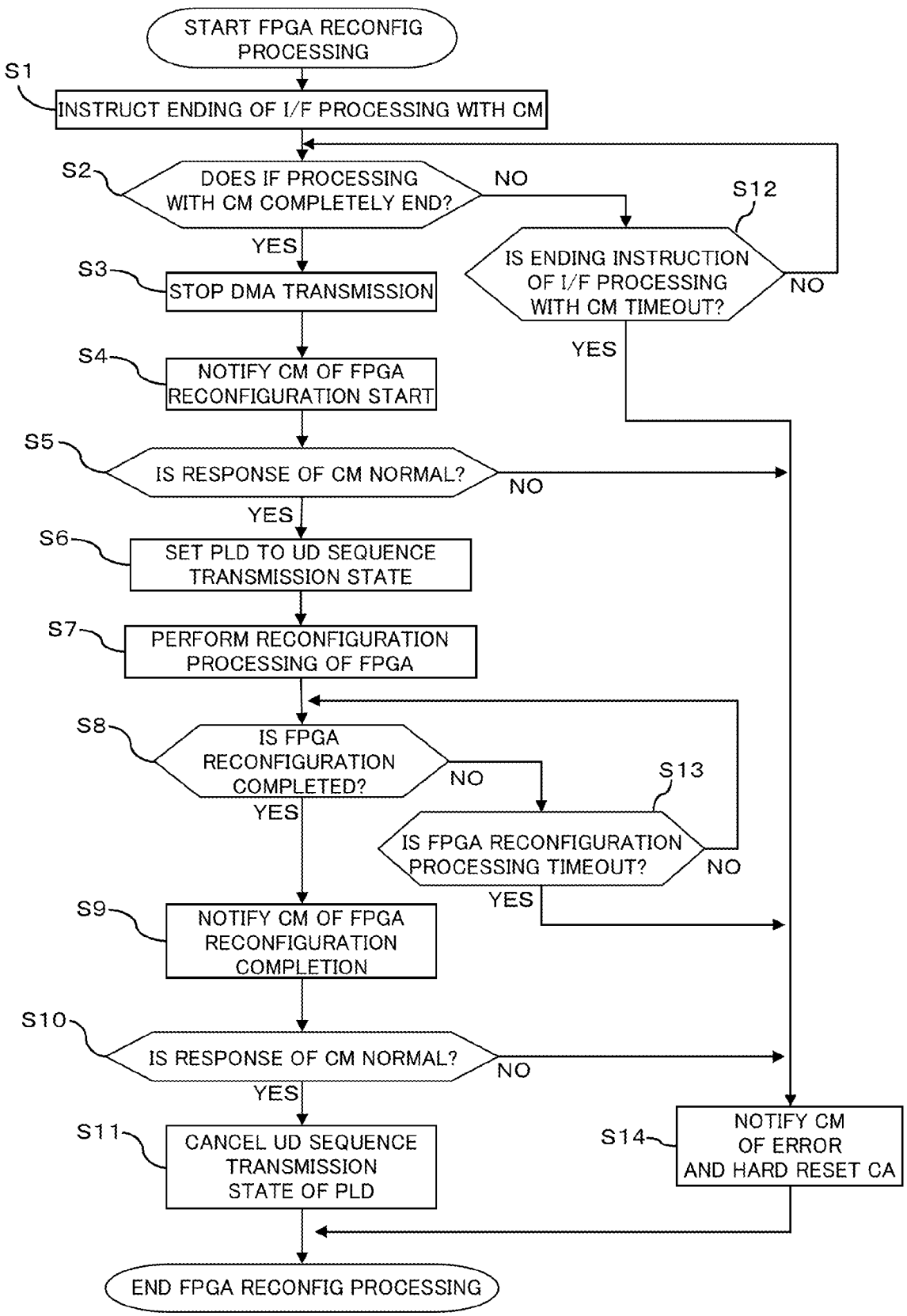
FIG. 6 is a flow chart for describing a reconfiguration processing of the FPGA in the storage system as the example of the embodiment.

Next, as the example of the embodiment, the reconfiguration processing of the FPGA 103 in the storage system 1 will be described with reference to a flow chart (steps S1 to S14) illustrated in FIG. 6.

First, in step S1, the CPU 101 (control unit 117) of the CA 10 instructs the ending of all the I/F processing with the CM 20. The control unit 117 instructs the FPGA 103 to stop the DMA transmission and the FPGA 103 stops the DMA transmission based on the DMA transmission stop instruction.

In step S2, the CPU 101 (control unit 117) of the CA 10 confirms whether all the I/F processing with the CM 20 end. When all the I/F processing with the CM 20 end (see YES route of step S2), in step S3, the CPU 101 instructs the FPGA 103 to stop the DMA transmission and stops the DMA transmission.

Further, in step S4, the CPU 101 instructs the PLD 102 (FPGA reconfiguration notification unit 114) to notify the FPGA reconfiguration start. According to the instruction, the FPGA reconfiguration notification unit 114 transmits the FPGA reconfiguration start notification to the CM 20.

The CM 20 receiving the FPGA reconfiguration start notification sets the CA 10 to the unusable state. Therefore, the communication to the CA 10 from the CM 20 is suppressed and in the CM 20, the communication error between the CA 10 and the CM 20 is not detected.

In step S5, the CPU 101 (control unit 117) confirms whether the response of the CM 20 is normal. If the response of the CM 20 is normal (see YES route of step S5), in step S6, the CPU 101 sets the PLD 102 (UD sequence transmission unit 113) to the UD sequence signal transmission state.

According to the instruction, the UD sequence transmission unit 113 sets the UD sequence signal to the transmission state, such that the host path is set to the busy state. When the host path is in the busy state, the host 2 does not recognize the path disconnection.

In step S7, the PLD 102 (configuration processing unit 116) of the CA 10 performs the reconfiguration of the FPGA 103.

In step S8, the CPU 101 (control unit 117) confirms whether the reconfiguration of the FPGA 103 is completed. When the FPGA reconfiguration is completed (see YES route of step S8), in step S9, the CPU 101 (control unit 117) causes the PLD 102 (FPGA reconfiguration notification unit 114) to notify the CM 20 of the FPGA reconfiguration completion.

The FPGA reconfiguration notification unit 114 transmits the FPGA reconfiguration completion notification to the CM 20.

Subsequently, in step S10, the CPU 101 (control unit 117) confirms again whether the response of the CM 20 is normal. If the response of the CM 20 is normal (see YES route of step S10), in step S11, the CPU 101 (control unit 117) releases the PLD 102 (UD sequence transmission unit 113) from the UD sequence signal transmission state. According to the instruction, the UD sequence transmission unit 113 releases the UD sequence transmission state, such that the busy state of the host path is released. By releasing the busy state of the host path, the data processing is feasible between the host 2 and the storage device 100 through the communication line 51. Therefore, the reconfiguration processing of the FPGA 103 ends.

Meanwhile, when all the I/F processing with the CM 20 do not end (see NO route of step S2), in step S12, the CPU 101 (control unit 117) confirms whether the instruction to end the I/F processing with the CM 20 is time-out.

If the instruction to end the I/F processing with the CM 20 is not time-out (see NO route of step S12), a process returns to step S2. When the instruction to end the I/F processing with the CM 20 is time-out (see YES route of step S12), in step S14, the CPU 101 (control unit 117) notifies the CM 20 of the error. The CM 20 receiving the error notification reboots the CA 10 by hard resetting the CA 10 to recover the FPGA from the soft error state and end the processing.

Further, in step S8, when the FPGA reconfiguration is not completed (see NO route of step S8), in step S13, the CPU 101 (control unit 117) determines whether the reconfiguration processing of the FPGA 103 is a time-out (step S13). If the reconfiguration of the FPGA 103 is not completed after a predetermined time lapses from the start of the reconfiguration, that is, the time-out is generated (see YES route of step S13), a process proceeds to step S14. In addition, in steps S5 and S10, even when it is determined that the response of the CM 20 is not normal (see NO route of steps S5 and S10), a process proceeds to step S14.

If the reconfiguration processing is not a time-out (see NO route of step S13), a process returns to step S8.

As such, according to the storage system 1 as the example of the embodiment, the soft error occurring in the FPGA 103 may be effectively resolved.

That is, when the reconfiguration of the FPGA 103 is performed, the PLD 102 (UD sequence transmission unit 113) causes the host 2 to set the UD sequence signal to the transmission state. Further, in this case, there is no need to hard reset the CA 10. Therefore, the host 2 responds to the UDR sequence signal, the host path between the host 2 and the CA 10 is in the busy state, and the host 2 is suppressed from recognizing the path disconnection of the host path. Therefore, even in the case of activating the reconfiguration of the FPGA 103, the host 2 does not recognize the path disconnection of the host path. That is, an operator or a repair and maintenance customer engineer needs to perform the online processing operation of the host path and may rapidly recover the storage system 1 after the reconfiguration of the FPGA 103. In addition, since the error notification is not performed from the host 2 to an operator or the like, the working time of the operator, and the like may be reduced, which is efficient.

Further, at the time of performing the reconfiguration of the FPGA 103, the PLD 102 (configuration processing unit 116) performs the FPGA reconfiguration start notification to the CM 20. The CM 20 receiving the FPGA reconfiguration start notification excludes the CA 10 from the monitored object to set the CA 10 to the unusable state. Therefore, even when the reconfiguration of the FPGA 103 is activated, the CM 20 does not detect the error of the CA 10 (FPGA 103) and the issuance of the failure notification of the CA 10 from the CM 20 is suppressed. In addition, at the time of performing the reconfiguration of the FPGA 103, in the CA 10, the CPU 101 (control unit 117) ends all the I/F processing with the CM 20, and thus new I/F processing is not performed between the CA 10 and the CM 20. Consequently, the CM 20 does not detect the error of the CA 10 during the reconfiguration of the FPGA 103.

That is, since the error notification is not performed from the CM 20 to an operator or a repair and maintenance customer engineer, and the like, it is suppress for the repair and maintenance customer engineer, and the like, to perform unnecessary operations for exchanging components such as the CA 10, such that efficiency and economic efficiency are improved.

Further, since there is no need to perform the hard reset of the CA 10, the storage system 1 may be rapidly recovered after the reconfiguration of the FPGA 103, without performing the online processing operation of the host path.

In the reconfiguration of the FPGA 103, the host 2 or the CM 20 reduces the frequency of detecting the error of the CA 10, such that the failure occurrence rate in the storage system 1 may be reduced.

The UD sequence transmission unit 113 transmits the UD sequence signal to the host 2, such that the host path is set to the busy state. Consequently, for example, even the apparatus not including a dedicated protocol chip may realize the host I/F processing, and therefore versatility is improved.

Further, the busy state of the host path may be released by releasing the transmission state of the UD sequence signal. In addition, the releasing of the busy state of the host path may be realized without depending on an operator, and the like. That is, the processing may be simplified, such that the convenience may be improved and the processing time may be shortened.

In the FPGA 103, the occurring soft error may be simply resolved in a short period of time, such that the operation efficiency of the system may be improved.

Further, the soft error of the FPGA 103 may be recovered by activating the reconfiguration of the FPGA 103, such that the convenience may be improved.

In addition, at the time of performing the reconfiguration of the FPGA 103, the DMA transmission between the CA 10 and the CM 20 stops or the FPGA reconfiguration start notification or the FPGA reconfiguration completion notification is transmitted to the CM 20. Consequently, even when the CA 10 performing the host I/F access processing and the CM 20 performing the disk access processing are divided, the soft error of the FPGA 103 may be recovered the FPGA reconfiguration processing with active state.

Further, the disclosed technology is not limited to the foregoing embodiment and may be variously changed without departing from the scope of the embodiment. Each component and each processing of the embodiment may be optionally selected or appropriately combined, if necessary.

For example, in the foregoing embodiment, in the CA 10, the PLD 102 (UD sequence transmission unit 113) sets the UD sequence signal to the transmission state to set the host path to the busy state, but the embodiment is not limited thereto. Instead of the method of transmitting the UD sequence signal to the host 2 from the CA 10, the host path may be in the busy state and appropriately changed by other methods.

Further, the foregoing embodiment discloses the FPGA reconfiguration for resolving the soft error of the FPGA 103 included in the CA 10 of the storage control apparatus 200. However, the embodiment is not limited thereto and may also be applied to the reconfiguration of the FPGA included in various information processing devices.

In addition, the embodiment can be worked and manufactured by those skilled in the art based on the foregoing disclosure.

According to the embodiment, the soft error occurring in the programmable logic circuit can be efficiently resolved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A storage control apparatus connected to an upper device by a communication device and controlling a data access to a storage device, the storage control apparatus comprising:
   a detection unit that detects a soft error of a memory for setting information included in a programmable logic circuit;
   a communication control unit that changes a state of a communication path between the communication device and the upper device; and
   a restoration processing unit that performs processing of restoring the memory for setting information of the programmable logic circuit,
   wherein when the detection unit detects the soft error, the communication control unit changes the state of the communication path between the communication device and the upper device from a usage state to a connection recovery state by outputting a communication control signal to the upper device so that the upper device does not recognize a path disconnection.

2. The storage control apparatus according to claim 1, wherein the communication control unit starts a transmission of a communication control signal from the communication device to the upper device to change the state of the communication path between the communication device and the upper device to the connection recovery state.

3. The storage control apparatus according to claim 1, further comprising:
   when the detection unit detects the soft error, a first processing unit causes a control device, managing the communication device that communicates with the upper device, to exclude the communication device from being a monitored object; and
   after the restoring of the memory for setting information by the restoration processing unit is completed, a second processing unit causes the control device to set the communication device as the monitored object.

4. The storage control apparatus according to claim 3, further comprising:
   when the detection unit detects the soft error, a transmission suppressing unit stops transmitting data to the control device.

5. A storage control apparatus connected to an upper device by a communication device and controlling a data access to a storage device, the storage control apparatus comprising:

a detection unit that detects a soft error of a memory for setting information included in a programmable logic circuit;

a processing unit that causes a management device managing the communication device to exclude the communication device from being a monitored object; and a restoration processing unit that performs processing of restoring the memory for setting information of the programmable logic circuit, wherein the management device monitors whether the communication device is normally operated, and when the detection unit detects the soft error, the processing unit causes the management device to exclude the communication device from being the monitored object in the management device by transmitting a field programmable gate array (FPGA) reconfiguration start notification to the management device so that the upper device does not recognize a path disconnection, and when the restoration processing unit completes the restoration processing, the processing unit sets the communication device as the monitored object in the management device by transmitting an FPGA reconfiguration completion notification from the communication device to the management device.

6. A computer-readable recording medium including a control program having a computer:

detect a soft error of a memory for setting information included in a programmable logic circuit;

when the soft error is detected, change a state of a communication path between a communication device and an upper device from a usage state to a connection recovery state by outputting a communication control signal to the upper device so that the upper device does not recognize a path disconnection; and restore the memory for setting information of the programmable logic circuit.

7. The computer-readable recording medium according to claim 6, wherein the state of the communication path between the communication device and the upper device is changed to the connection recovery state by starting a transmission of a communication control signal from the communication device to the upper device.

8. The computer-readable recording medium according to claim 6, further comprising:

when the soft error is detected, exclude the communication device from being a monitored object in a control device managing the communication device that communicates with the upper device; and after the restoring of the memory for setting information is completed, set the communication device as the monitored object in the control device.

9. The computer-readable recording medium according to claim 8, further comprising:

when the soft error is detected, stop a data transmission to the control device.

10. A computer-readable recording medium including a control program having a computer:

detect a soft error of a memory for setting information included in a programmable logic circuit;

when the soft error is detected, exclude a communication device, communicating with an upper device, from being a monitored object in a control device monitoring whether the communication device is normally operated by transmitting a field programmable gate array (FPGA) reconfiguration start notification to the control device so that the upper device does not recognize a path disconnection;

when the restoring is completed, set the communication device as the monitored object in the control device by transmitting an FPGA reconfiguration completion notification from the communication device to the control device; and restore the memory for setting information of the programmable logic circuit.

* * * * *